United States Patent [19]

Fujita

[11] Patent Number: 4,651,327
[45] Date of Patent: Mar. 17, 1987

[54] DECODER FOR SPECTRUM DIFFUSION SIGNALS

[75] Inventor: Masahiro Fujita, Kanagawa, Japan

[73] Assignee: Sony Corporation, Tokyo, Japan

[21] Appl. No.: 785,854

[22] Filed: Oct. 9, 1985

[30] Foreign Application Priority Data

Oct. 12, 1984 [JP] Japan ............................... 59-214599

[51] Int. Cl.$^4$ ..................... H04K 1/00; H04L 27/30
[52] U.S. Cl. .................................... 375/1; 375/115; 370/107
[58] Field of Search .................... 375/1, 115, 2.2, 2.1; 370/107, 18; 343/356, 357, 394; 178/22.11; 455/1, 26

[56] References Cited

U.S. PATENT DOCUMENTS

| | | | |
|---|---|---|---|
| 4,114,155 | 9/1978 | Raab | 343/394 |
| 4,392,220 | 7/1983 | Hirosaki et al. | 370/18 |
| 4,445,118 | 4/1984 | Taylor et al. | 343/357 |
| 4,471,164 | 9/1984 | Henry | 178/22.11 |
| 4,538,281 | 8/1985 | Rajan | 375/2.2 |

Primary Examiner—Robert L. Griffin
Assistant Examiner—Stephen Chin
Attorney, Agent, or Firm—Lewis H. Eslinger; Alvin Sinderbrand

[57] ABSTRACT

A decoder for spectrum diffusion signals is capable of reproducing data from received a spectrum diffusion signal, such as satellite communication signals, without performing PN synchronization. The decoder comprises a correlation detector comprising a matched filter which produces a back-diffusion signal when a received spectrum diffusion signal correlates with a Gold code for a specific channel of a station, an extraction signal generator for detecting the epoch position of a peak of a triangular wave which appears in the output of the correlation detector and providing an extraction signal when correlation between the spectrum diffusion signal and the specific Gold code identifying the corresponding channel is established, and a data output extractor responsive to the extraction signal to extract the back-diffusion signal from the output of the correlation detector and reproduce the resulting data. In this arrangement, the extraction signal generator is responsive to the peak of the triangular-form wave in the back-diffusion signal from the correlation detector to output the extraction signal. Therefore, according to the invention, it is unnecessary to perform PN synchronization in order to obtain data from the spectrum diffusion signal.

28 Claims, 8 Drawing Figures

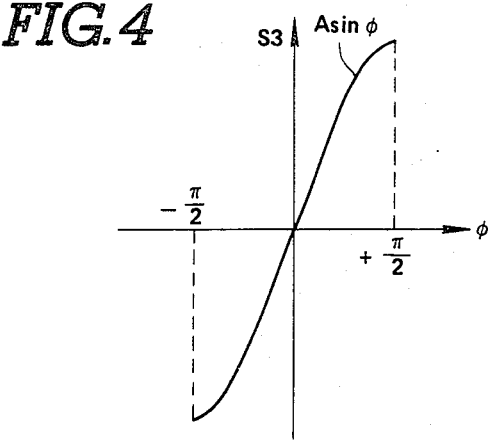
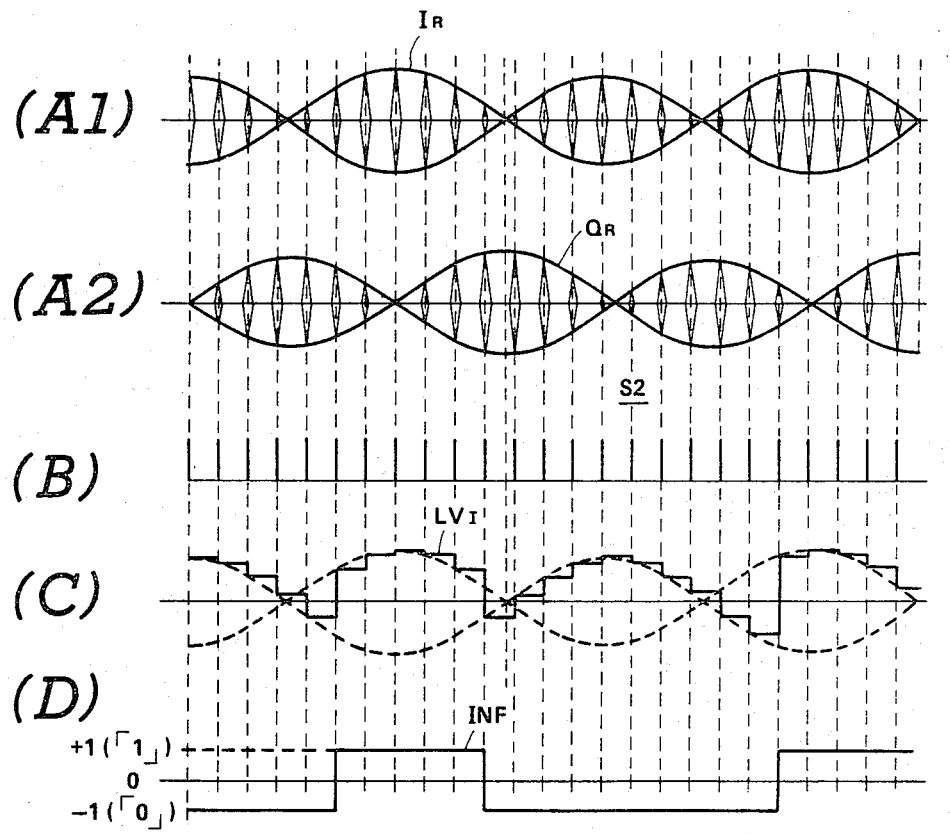

DECODER FOR SPECTRUM DIFFUSION SIGNALS

BACKGROUND OF THE INVENTION

The present invention relates generally to a decoder for spectrum diffusion signals, which is specially adapted for satellite communications utilizing spectrum diffusion signals.

Spectrum diffusion communications systems (hereafter called as "SS communications systems") are know to be advantageous in that they can use pseudo-random-noise signals (hereafter referred to as "PRN signals") which allow sufficiently precise frequency channel selection and thus satisfactorily avoid interference among communication channels. Therefore, information security can be guaranteed by use of such SS communications systems. In addition, such SS communications systems have the advantage that PRN signals have a relative high band width for modulating data signals.

In such SS communications systems, received satellite signals must be demodulated in the receiving station. In order to demodulate the satellite signal, processing by back-diffusion has to be performed utilizing a Gold code specific to the station to keep the specific communications channel secure.

For such back-diffusion process, it has been conventionally believed that the phase of the Gold code must be synchronized with the phase of the received PRN signal by the decoder itself when checking the codes for a match. This synchronization will be referred to hereafter as "PN synchronization". Therefore, conventional decoders for spectrum diffusion signals have required means for performing PN synchronization, such as sliding correlating loops or matched filters or the like. Such means for performing PN synchronization prevents simplification of the decoder circuitry.

OBJECTS AND SUMMARY OF THE INVENTION

Therefore, it is a principle object to provide a decoder which has a simpler structure than conventional decoders.

Another object of the invention is to provide a decoder which does not require a PN synchronization device.

In order to accomplish the aforementioned and other objects, a decoder for spectrum diffusion signals, according to the present invention, can reproduce data from received SS signals without performing PN synchronization.

The decoder comprises correlation detecting means comprising a matched filter which produces a back-diffusion signal when a received spectrum diffusion signal correlates with a Gold code for a specific channel of a station, extraction signal generator means for detecting the epoch position of a peak of a triangular wave which appears in the output of the correlation detecting means when correlation between the spectrum diffusion signal and the specific Gold code identifying the corresponding channel is established, and data output extracting means responsive to the extraction signal to extract the back-diffusion signal and reproduce the resulting data.

In the arrangement set forth above, the extraction signal generator means is responsive to the peak of the triangular-form wave in the back-diffusion signal from the correlation detecting means to output the extraction signal. The extraction signal is sent to the data output extraction means to extract the back-diffusion signal from the output of the correlation detecting means and reproduce the data output. Therefore, according to the invention, it is unnecessary to peform PN synchronization in order to obtaining data from the spectrum diffusion signal.

According to one aspect of the invention, a decoder for spectrum diffusion signals comprises correlation means for comparing a PRN signal included in the spectrum diffusion signal with a Gold code identifying a specific channel, the correlation means producing a back-diffusion signal when the PRN signal matches the Gold code, extraction signal generator means responsive to the back-diffusion signal for producing an extraction signal at a timing near that at which the back-diffusion signal value reaches a peak, and extraction means, responsive to the extraction signal, for extracting a data signal from the back-diffusion signal.

The correlation means produces a triangular wave each time the PRN code matches the Gold code.

The decoder further comprises means for forming a frequency component enveloped by the triangular signal. The frequency component enveloped by the triangular signal has a frequency twice as high as a carrier wave in the spectrum diffusion signal. The frequency component forming means comprises a voltage-controlled oscillator and a multiplier, which voltage-controlled oscillator produces a local oscillation signal having a frequency substantially corresponding to that of the carrier wave, and which multiplier receives the spectrum diffusion signal and multiplies the spectrum diffusion signal by the local oscillation signal to form the envelope.

The decoder further comprises an oscillation control means associated with the voltage-controlled oscillator for controlling the latter so as to adjust the phase of the local oscillation signal to match the phase of the carrier wave of the spectrum diffusion signal. The oscillation control means comprises a multiplier receiving the spectrum diffusion signal and a local oscillation signal, the phase of which is shifted by a phase-shifter to a given offset from the phase of the local oscillation signal output by the voltage-controlled oscillator, a second correlation means for producing a back-diffusion signal including a triangular wave produced when the PRN signal matches the Gold code, a filter for removing high frequency components from the back-diffusion signal of the second correlation means and outputting an envelope signal, and a holding circuit receiving the envelope signal and holding the signal level thereof in response to the extraction signal, and a multiplier multiplying the reproduced data signal and the output of the holding circuit so as to derive an oscillation control signal for controlling the signal phase of the local oscillation signal of the voltage-controlled oscillator.

The extraction signal generator comprises a multiplier-adder which derives the squares of each of the back diffusion signals of first mentioned correlation means and the second correlation means, and then adds the squares to produce a sum indicative signal, and a level detector responsive to the sum indicative signal exceeding a given value to feed the extraction signal to the extraction circuit.

In the alternative, the frequency component forming means comprises a delay circuit and a multiplier, the delay circuit transmitting the back-diffusion signal after a given delay time, and the multiplier multiplying the back-diffusion signal transmitted directly by the correlation means with the delayed back-diffusion signal from the delay circuit to generate the frequency components enveloped by the triangular wave and having a frequency twice as high as the carrier wave of the spectrum diffusion signal. The extraction signal generator means comprises an envelope detector producing an envelope indicative signal, and a level detector for monitoring the level of the envelope indicative signal and outputting the extraction signal when the signal level of the envelope indicative signal exceeds a given level.

The correlation means outputs more than one triangular wave signal during a period corresponding to one cycle of the Gold code.

According to another aspect of the invention, a decoder for spectrum diffusion signals comprises correlation means receiving the spectrum diffusion signal for comparing a PRN signal contained in the spectrum diffusion signal with a given Gold code which identifies a communication channel, and producing a back-diffusion signal including a data component representative of the data indicative phase-shift of the spectrum diffusion signal, an extraction signal generator associated with the correlation means for detecting peak values of the data component and producing an extraction signal at a timing near the peak value of the data component, and an extraction circuit receiving the back-diffusion signal and responsive to the extraction signal to extract the data component from the back-diffusion signal.

According to a further aspect of the invention, a process for reproducing data from a spectrum diffusion signal comprises the steps of:

receiving the spectrum diffusion signal, comparing a PRN signal contained in the spectrum diffusion signal with a given Gold code which identifies a communication channel, and producing a back-diffusion signal including a data component representative of the data indicative phase-shift of the spectrum diffusion signal;

detecting peak values of the data component and producing an extraction signal at a timing near the peak value of the data component; and extracting the data component from the back-diffusion signal in response to the extraction signal.

The data component is in the form of a triangular wave each time the PRN code matches the Gold code.

The process further comprises a step of forming a frequncy component enveloped by the triangular signal. The frequency component enveloped by the triangular signal has a frequency twice as high as a carrier wave in the spectrum diffusion signal.

The process further comprises a step of controlling the phase of a local oscillation signal utilized for forming the frequency component so as to adjust the phase of the local oscillation signal to match the phase of the carrier wave of the spectrum diffusion signal.

In the alternative, the frequency component is formed by transmitting the back-diffusion signal after a given delay time, and multiplying the back-diffusion signal transmitted directly with the delayed back-diffusion signal to generate the frequency components enveloped by the triangular wave and having a frequency twice as high as the carrier wave of the spectrum diffusion signal.

BRIEF DESCRIPTION OF THE DRAWINGS

The present invention will be understood from the detailed description given herebelow and from the accompanying drawings of preferred embodiments of the invention, which, however, should not be taken to limit the invention to the specific embodiment, but are for explanation and understanding only.

In the drawings;

FIG. 4 shows the characteristics of an oscillation control signal;

FIG. 5 is a timing chart with waveforms 5A1, 5A2, 5B–5D of operation of some components of the decoder;

DESCRIPTION OF THE PREFERRED EMBODIMENTS

Figure 1:
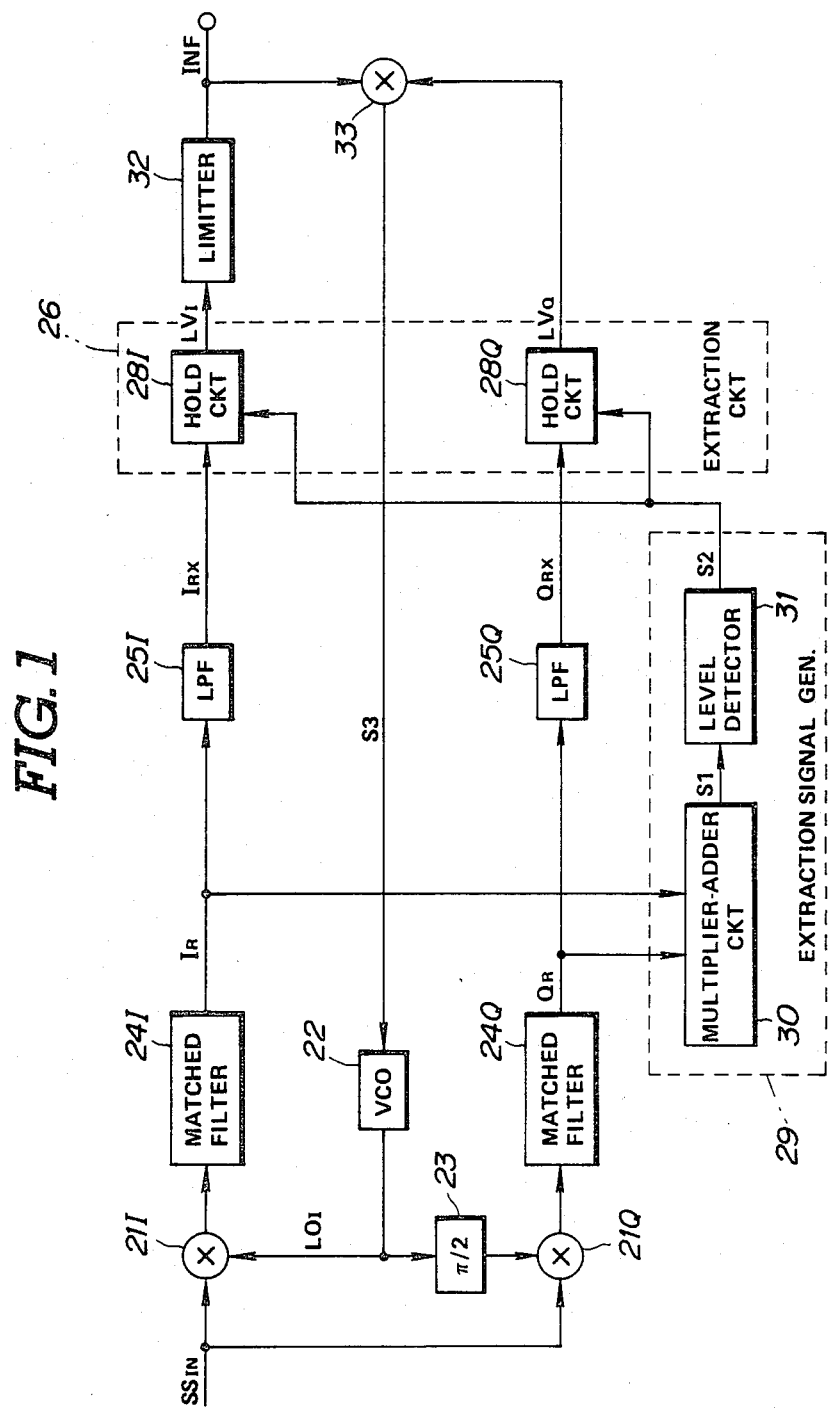
FIG. 1 is a block diagram of a first embodiment of a decoder for a spectrum diffusion signal according to the invention.

Referring now to the drawings, and particularly to FIG. 1, it will be seen that a preferred embodiment of a decoder for a spectrum diffusion signal, according to the invention, is there shown to be specifically adapted to receive a sinusoidal SS signal, which will be referred to hereafter as "$SS_{in}$ signal". The carrier wave of the $SS_{in}$ signal is modulated by phase-shifting. the $SS_{in}$ signal waveform satisfies the following equation:

$$SS_{in} = \pm A \cos(\omega_c t + \phi) \quad (1)$$

where $\omega_c$ is an angular frequency of the carrier;

$\phi$ is the phase difference between the $SS_{in}$ signal and the output $LO_1$ of a voltage controlled oscillator 22 which will be described later; and A is the wave amplitude.

An I-arm side multiplier $21_I$ and a Q-arm side multiplier $21_Q$ are built into the decoder. The $SS_{in}$ signal is input to both of the multipliers $21_I$ and $21_Q$. The I-arm side multiplier $21_I$ also receives the output $LO_I$ of the voltage-controlled oscillator 22. On the other hand, the Q-side multiplier $21_Q$ receives the local oscillation signal $LO_Q$ which is a phase-shifted form of the output $LO_I$ of the voltage-controlled oscillator 22. Phase-shifting of the output $LO_I$ of the voltage-controlled oscillator 22 through a phase offset on $\pi/2$ is performed by a phase shifter 23, which phase shifter 23 will be referred to as "$\pi/2$-phase shifter". The $LO_I$ signal of the I-arm side multiplier $21_I$ satisfies the following equation:

$$LO_1 = \cos \omega_c t \quad (2)$$

The $LO_I$ signal is multiplied by the $SS_{in}$ signal by the I-arm side multiplier $21_I$. As a result, the output of the multiplier $21_I$ may include a signal component at twice the frequency of the carrier wave and a beat component derived from the phase difference between the $LO_I$ signal and the $SS_{in}$ signal. The waveform of the output of the I-arm side multiplier $21_I$ can be expressed by the following equation:

$$SS_{in} \times LO_I = \pm A[\cos(2\omega_c t + \phi) + \cos \phi] \quad (3)$$

The output of the I-arm side multiplier $21_I$ will be hereafter referred to as I-arm signal I.

On the other hand, the local oscillation signal $LO_Q$ is shifted in phase through $\pi/2$ radians with respect to the phase of the $LO_I$ signal. The local oscillation signal $LO_Q$ satisfies the following equation:

$$LO_Q = \sin \omega_c t \quad (4)$$

The local oscillation signal $LO_Q$ is multiplied by the $SS_{in}$ signal by the Q-arm side multiplier $21_Q$. The output of multiplier $21_Q$ includes a signal component at twice the frequency of the carrier wave and a beat component. The resultant output of the multiplier $21_Q$ will be hereafter referred to as "Q-arm signal Q".

The Q-arm signal Q satisfies the following equation:

$$SS_{in} \times LO_Q = \pm A[\sin(2\omega_c t + \phi) + \sin \phi] \quad (5)$$

As will be appreciated herefrom, the beat component in the I-arm signal is a cosine wave ($\cos \phi$) and the beat component of the Q-arm signal is a sine wave ($\sin \phi$). Therefore, the beat components of the I-arm signal and Q-arm signal are offset in phase by 90° with respect to each other.

Figure 2:
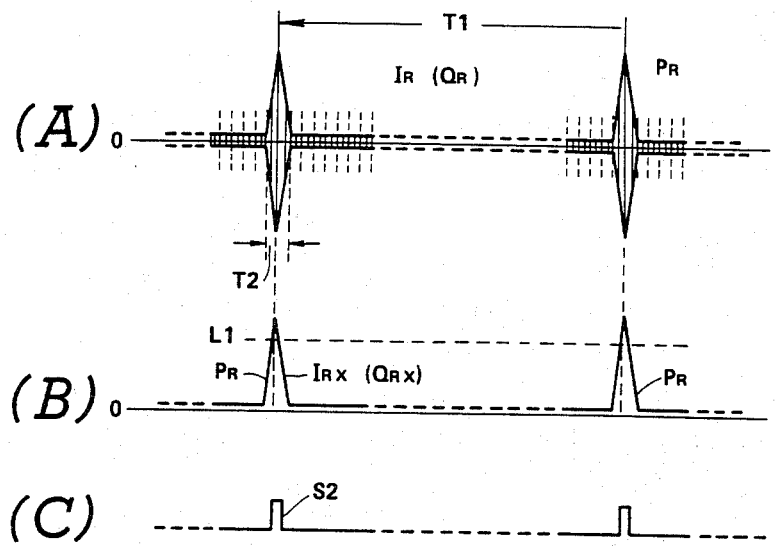
FIG. 2 is a timing chart for some waveforms 2A–2C produced in the components of the decoder.

The I-arm signal and the Q-arm signal are sent to matched filters $24_I$ and $24_Q$ respectively. Each of the matched filters $24_I$ and $24_Q$ comprises a surface acoustical wave (SWA) filter which simulates a comb-teeth pattern corresponding to a logical code arrangement of bits defining the Gold code for the specific channel. The matched filters $24_I$ and $24_Q$ form a correlation detecting means and each receives data from each sample period of the signal corresponding to one cycle of the Gold code when the data coincides with a "transmit" bit of the Gold code. The matched filters $24_I$ and $24_Q$ compare the received signals with the bits of the preset Gold code in these fixed time blocks. The matched filters $24_I$ and $24_Q$ output back-diffusion signals $I_R$ and $Q_R$. As will be seen from FIG. 2, the back-diffusion signals $I_R$ and $Q_R$ include triangular-wave components when the PRN signal matches the Gold code of a specific channel. Therefore at every given period $T_1$ which corresponds to one cycle of the Gold code, the triangular wave appears in the back-diffusion signal. The back-diffusion signals $I_R$ and $Q_R$ have frequency components at twice the frequency of the carrier wave and a beat component, as indicated by the foregoing equations (3) and (5) and as shown in FIG. 2(A).

The back-diffusion signals $I_R$ and $Q_R$ are sent to low-pass filters $25_I$ and $25_Q$ which remove the higher frequency components. The wave-form of the output of the low-pass filters $25_I$ and $25_Q$ is shown in FIG. 2(B). The outputs of the low-pass filters $25_I$ and $25_Q$ serve as triangular-wave envelope signals $I_{RX}$ and $Q_{RX}$. The triangular wave envelope signals $I_{RX}$ and $Q_{RX}$ are respectively sent to corresponding holding circuits $28_I$ and $28_Q$ of an extraction circuit 26.

The back-diffusion signals $I_R$ and $Q_R$ are also sent to a quadratic multiplier or multiplier-adder circuit 30 in an extraction signal generator circuit 29. The output of the quadratic multiplier 29 can be represented by the following equation:

$$S_1 = I_R^2 + Q_R^2 \quad (6)$$

Summing the squares of the back-diffusion signals $I_R$ and $Q_R$, the frequency components of which vary between positive and negative phases, has the same effect as adding the absolute amplitudes of the back-diffusion signals $I_R$ and $Q_R$. The resultant value behaves in the same manner as the triangular-wave envelope signals $I_{RX}$ and $Q_{RX}$ from the low-pass filters $25_I$ and $25_Q$.

The output $S_1$ of the multiplier-adder 30 is sent to a level detector circuit 31. The level detector circuit 31 has a threshold value which corresponds to a predetermined level $L_1$ proportional to the amplitude of the triangular-wave envelope signals $I_{RX}$ and $Q_{RX}$, and is compared with the output $S_1$ of the multiplier-adder circuit 30. The level detector circuit 31 outputs a detector signal $S_2$ which is shown in FIG. 2(C) when the output level $S_1$ exceeds the threshold value. The level detector circuit 31 feeds the detector signal $S_2$ to the holding circuits $28_I$ and $28_Q$ of the extraction circuit 26. This detector signal $S_2$ serves as an extraction trigger signal.

The holding circuits $28_I$ and $28_Q$ sample the triangular-wave envelope signals $I_{RX}$ and $Q_{RX}$ respectively in response to the extraction signal $S_2$ from the level detector circuit 31. It should be appreciated that the polarity of the triangular-wave envelope signals $I_{RX}$ and $Q_{RX}$ corresponds to the phase-shift direction of the corresponding back-diffusion signals $I_R$ and $Q_R$. Therefore, the values held in the holding circuits $28_I$ and $28_Q$ are at or near the peak values of the triangular waves in the back-diffusion signals $I_R$ and $Q_R$.

The triangular waves in the back-diffusion signals $I_R$ and $Q_R$ appearing in each cycle $T_1$ of the Gold code have a higher frequency than occurrences of the data signal which is transmitted in the form of a phase-shifted modulated signal. Therefore, the holding circuits $28_I$ and $28_Q$ will hold positive signal levels corresponding to a logical "1" while the data signal has a phase-shift representative of logical "1" and circuits $28_I$ and $28_Q$ hold negative signal levels while the phase shift of the data signal represents logical "0".

The holding circuits $28_I$ and $28_Q$ output level outputs $LV_I$ and $LV_Q$ which respectively correspond to the held signal levels. The level output $LV_I$ of the holding circuit $28_I$ is sent to a limiter 32. The limiter 32 converts the level signal $LV_I$ into binary code having logical values, i.e. "0" or "1" while limiting the input signal level to within predetermined negative and positive reference levels. This binary code is output as reproduced data signal INF.

The reproduced data signal INF is also sent to a multiplier 33, which also receives the level signal $LV_Q$ from the holding circuit $28_Q$. The data signal INF is multiplied by the level signal $LV_Q$ of the holding circuit $28_Q$. The resultant output $S_3$ of the multiplier 33 is applied to the voltage controlled oscillator 22 as an oscillation control signal.

Figure 3:
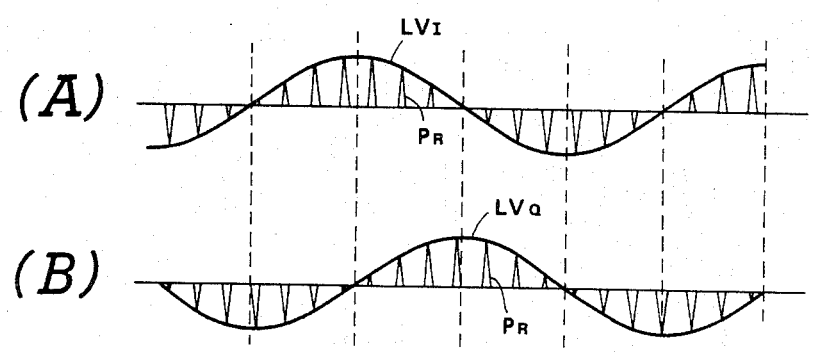
FIG. 3 is a timing chart showing triangular-form waves 3A and 3B making up the output of a correlation detecting means in the decoder.

As set forth above, the level signals $LV_I$ and $LV_Q$ of the holding circuits $28_I$ and $28_Q$ are derived from the envelope signals $I_{RX}$ and $Q_{RX}$ which are formed by removing the carrier components from the back-diffusion signals $I_R$ and $Q_R$. Therefore, the amplitude of the level signals $LV_I$ and $LV_Q$ varies with the frequency of the beat components which correspond to the phase difference $\phi$ between the carrier wave of the $SS_{in}$ signal and the local oscillation signal $LO_I$ of the voltage-controlled oscillator 22. Taking this into account, the output levels $LV_I$ and $LV_Q$ of the triangular waves in the back-diffusion signals $I_R$ and $Q_R$ oscillate sinusoidally between positive and negative peaks depending upon the beat frequencies as shown in FIGS. 3(A) and 3(B). As mentioned previously, the variation of the output level $LV_I$ in the I-arm side corresponds to its beat component, i.e. cos $\phi$. Likewise, the variation of the output level $LV_Q$ in the Q-arm side follows its beat component, i.e. sin $\phi$.

The level signal $LV_1$ of the holding circuit $28_I$ in the I-arm side is converted into the reproduced data signal INF in the limiter 32. Therefore, the reproduced data signal INF varies between +1 and −1 which corresponds to a phase shift between +$\pi$/2 and −$\pi$/2. Therefore, the oscillation control signal $S_3$ can be represented by the following equation:

$$S_3 = (\pm A \sin \phi) \times (\pm 1) \quad (7)$$
$$= A \sin \phi$$

In the foregoing equation (7), $\phi$ represents the phase difference between the carrier wave in the $SS_{in}$ signal and the oscillation signal $LO_I$ from the voltage-controlled oscillator 22. Therefore, the oscillation control signal $S_3$ varies according to the equation (7) as the phase difference $\phi$ varies between +$\pi$/2 and −$\pi$/2. By controlling the voltage controlled oscillator 22 utilizing the oscillation control signal $S_3$ derived as set forth above, the influence of the beat components in the triangular wave $P_R$ of the level signal $LV_I$ can be eliminated.

Specifically, by suitably controlling the voltage controlled oscillator 22, the phase difference between the carrier wave in the $SS_{in}$ signal and the oscillation signal $LO_I$ can be controlled to zero. This fully cancels the influence of the beat component on the peak value of the triangular wave $P_R$ in the level signal $LV_I$. Therefore, the level of the level signal $LV_I$ accurately reflects the data value intended by the magnitude of phase shift.

According to the shown embodiment, the $SS_{in}$ signal is first converted into the I-arm signal I and the Q-arm signal Q, each including a frequency component at twice the frequency of the carrier wave by multiplication by the local oscillation signal $LO_I$ and $LO_Q$ by the multipliers $21_I$ and $21_Q$. The matched filters $24_I$ and $24_Q$ output the back-diffusion signals $I_R$ and $Q_R$, which include triangular waves $P_R$ generated each time the PRN code in the $SS_{in}$ signal matches the Gold code identifying the specific channel. Each of the back-diffusion signals $I_R$ and $Q_R$ is superimposed on the frequency of the voltage controlled oscillator output and the beat component originating from the phase difference of the carrier wave of the $SS_{in}$ signal and the local oscillation signal from the voltage controlled oscillator 22 is thereby eliminated.

As set forth above, since the local oscillation signals $LO_1$ and $LO_Q$ supplied to the multipliers $21_I$ and $21_Q$ are mutually phase-shifted by 90°, the back-diffusion signals $I_R$ and $Q_R$ from the matched filters $24_I$ and $24_Q$ are also offset in phase by 90°, as shown in FIGS. 5($A_1$) and 5($A_2$). This phase shift between the back-diffusion signals $I_R$ and $Q_R$ occurs due to phase difference between their beat components. Therefore, the triangular waves $P_R$ of the back-diffusion signals $I_R$ and $Q_R$ appear at different times, which timing difference corresponds to a phase difference of 90° between the beat components.

When a triangular wave $P_R$ appears in either one of the back-diffusion signals $I_R$ and $Q_R$, the data signal phase shift keying modulated onto the carrier wave in the $SS_{in}$ signal is obtained through the corresponding matched filter $24_I$ or $24_Q$.

As earlier noted, the extraction signal generator circuit 29 employs a multiplier-adder circuit to obtain the sum of the squares of the back-diffusion signals $I_R$ and $Q_R$. Based on this sum, the level detector circuit 31 detects the epoch of the peak of the triangular-wave $P_R$ in the back-diffusion signals and produces the extraction signal $S_2$, as shown in FIG. 5(B). In this arrangement, since the epoch of the peak of the triangular wave is detected based on the squares of the back-diffusion signals $I_R$ and $Q_R$, the beat components of the back-diffusion signals have no effect on detection of the peak of the triangular wave significant enough to influence the results. Therefore, the extraction signal timing is reliably accurate.

The level signals $LV_I$ and $LV_Q$ vary as shown in FIG. 5(C), in which only the level signal $LV_I$ is shown. The level signals $LV_I$ and $LV_Q$ behave this way because of the phase information imposed on the carrier, which phase shift is indicative of the data to be transmitted, and because of the beat component resulting from the phase shift between the carrier of the $SS_{in}$ signal and the local oscillation signal from the voltage controlled oscillator 22. The limiter 32 converts the level signal $LV_I$ from the holding circuit $28_I$ into a binary signal varying between +1 and −1. For this purpose, the limiter 32 compares the signal level to a predetermined level such that a reproduced data signal value INF of "1" is output when the level signal $LV_I$ exceeds the predetermined level and −1 is output otherwise. This binary reproduced data signal is provided as the decoder output.

At the same time, the reproduced data signal INF is sent to the multiplier 33. The multiplier 33 is responsive to the reproduced data signal INF and the level signal $LV_Q$ to output the oscillation control signal $S_3$ according to the foregoing equation (7). The oscillation control signal $S_3$ controls the voltage controlled oscillator 22 so as to reduce the phase shift between the local oscillation signal $LO_I$ and the carrier wave of the $SS_{in}$ signal to zero. When the phase-shift $\phi$ between the local oscillation signal $LO_I$ and the carier wave of the $SS_{in}$ signal equals zero, the beat component in the back-diffusion signal is completely absent. As a result, the envelopes of the back-diffusion signals $I_R$ and $Q_R$ can be controlled to a given constant value.

As will be appreciated from the above decoder for spectrum diffusion signals utilized for example for satellite communications, according to the embodiment of the invention shown in FIG. 1, can reproduce data without using a loop for PN synchronization. This help's simplify the decoder per se and also the overall receiver unit, such as a GPS (global positioning system) receiver.

Although the above embodiment of the decoder is designed for synchronous detection, the decoder according to the present invention can be applied to other kinds of detection systems. For example, a decoder according to the invention can be applied to a delayed detection system.

Figure 6:
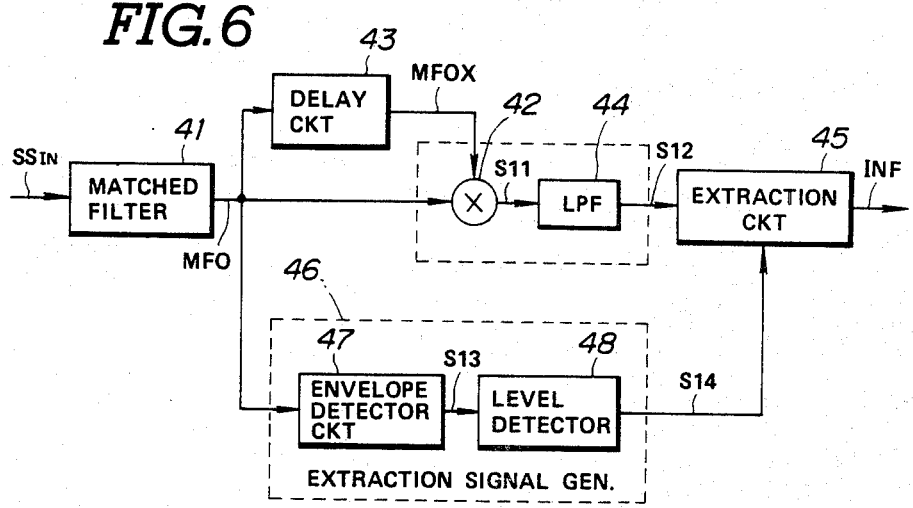
FIG. 6 is a block diagram of another embodiment of the decoder according to the invention.

FIG. 6 shows another embodiment of a decoder for spectrum diffusion signals according to the present invention, which decoder is suitable for delayed detection. In this embodiment, the $SS_{in}$ signal is input to a matched filter 41. The matched filter 41 outputs a filter output MFO which includes triangular wave $P_R$ when the PRN signal in the $SS_{in}$ signal matches the Gold code identifying the specific channel. As in the preceding embodiment, the triangular waves appear in the filter output MFO at given periods corresponding to the duration of the Gold code.

The filter output MFO is sent to a multiplier 42. The filter output MFO is also sent to a delay circuit 43. The delay circuit 43 delays the filter output MFO by $\pi/2$ and then supplies it to the multiplier 42 as delayed filter output MFOX. In the multiplier 42, the delayed filter output MFOX is multiplied by the filter output MFO. The multiplier 42 thus outputs a multiplier output $S_{11}$, in which the triangular wave $P_R$ has a frequency twice as high as the carrier wave of the $SS_{in}$ signal. The multiplier output $S_{11}$ has substantially the same waveform as illustrated in FIG. 2(A). The multiplier output $S_{11}$ is sent to a low-pass filter 44. The low-pass filter 44 filters out the carrier component and outputs an envelope output $S_{12}$ which corresponds to the signal shown in FIG. 2(B). This envelope signal $S_{12}$ is input to an extraction circuit 45.

The filter output MFO is also sent to an extraction signal generator circuit 46. The extraction signal generator circuit 46 comprises an envelope detector circuit 47 and a level detector 48. The envelope detector circuit 47 derives an envelope output $S_{13}$ which is representative of the envelope of the filter output MFO. The level detector 48 detects variations in the envelope signal $S_{13}$ level and provides as an output an extraction pulse signal $S_{14}$ at the peak of the triangular wave $P_R$. The extraction pulse signal $S_{14}$ is sent to the extraction circuit 45. The extraction circuit 45 is responsive to the extraction pulse signal $S_{14}$ to extract the signal level of the envelope signal $S_{12}$ from the low-pass filter and output it as the reproduced data signal INF.

In the arrangement of FIG. 6, the extraction pulse signal $S_{14}$ is generated at a timing coincident with the peak of the triangular wave $P_R$. Therefore, extraction signals occur at given periods matching the duration of the Gold code. At this timing, the extraction circuit 45 is activated to extract the data signal from the envelope signal $S_{12}$ from the low-pass filter 44.

Therefore, in the embodiment of this embodiment shown in FIG. 6, the data signal can again be reproduced without performing PN synchronization, as in the first described embodiment.

Although the embodiment shown in FIG. 6 employs a matched filter 41 which generates a triangular wave $P_R$ each time the PRN signal in the $SS_{in}$ signal matches the Gold code, it may be possible to produce more than one triangular wave during each cycle of the Gold code. Increasing the frequency of occurence of the triangular waves $P_R$ in each cycle of the Gold code increases the data volume obtainable from the $SS_{in}$ signal.

An example of such modification will now be described with reference to FIG. 7.

Figure 7:
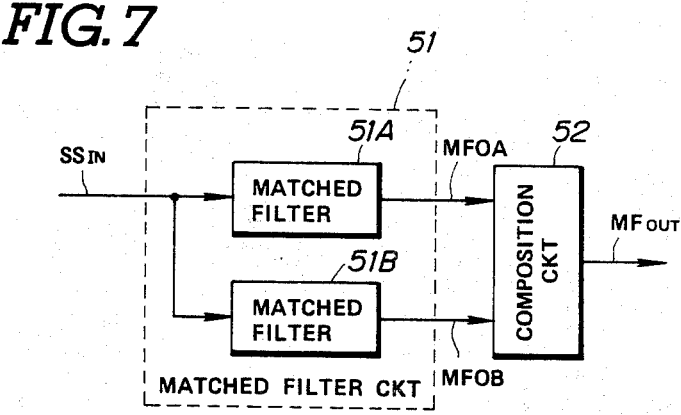
FIG. 7 is a block diagram of a further embodiment of the decoder of the invention.

In FIG. 7, a matched filter circuit 51 comprises a pair of parallelly connected matched filters $51_A$ and $51_B$. Both of the matched filters $51_A$ and $51_B$ receive the $SS_{in}$ signal and output respective filter outputs MFOA and MFOB. The filter outputs MFOA and MFOB of the matched filters $51_A$ and $51_B$ are both sent to a composition circuit 52. The composition circuit 52 combines the two filter outputs MFOA and MFOB to obtain a composite filter output $MF_{out}$.

Figure 8:
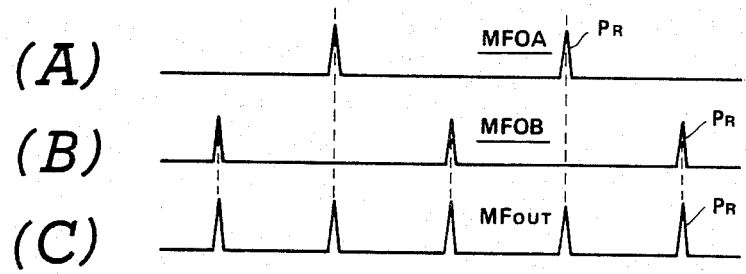
FIG. 8 is a timing chart with waveforms 8A–8C for the components shown in FIG. 7.

The matched filter $51_B$ uses a filter pattern which corresponds to a Gold code which matches the PRN signal at a different timing than the timing at which the Gold code of the matched filter $51_A$ and the PRN signal in the $SS_{in}$ signal. Specifically, in the shown embodiment, the matched filter $51_B$ generates a triangular wave $P_R$ at a timing offset from the timing of triangular wave $P_R$ in the filter output MFOA by one half-cycle of the given Gold code, as shown in FIG. 8. Therefore, the triangular waves $P_R$ in the composite filter output $MF_{out}$ occur at every half-cycle of the Gold code.

Therefore, by employing the arrangement of FIG. 7, the decoder can use twice as many sampling points to increase the data transfer rate.

Although the example of FIG. 7 doubles the frequency of the triangular signal in comparison with the embodiments of FIGS. 1 and 6, the frequency of occurence of the triangular waves is not to be limited to the shown embodiments. Any frequency of occurence of the triangular waves can be achieved in various ways.

As will be appreciated herefrom, according to the present invention, the decoder for the spectrum diffusion signal can obtain data from a SS signal, such as satellite signal, without the need for a PN synchronization loop. Therefore, the construction and function of the decoder can be simplified. Thus, the invention fulfills all of the objects and advantages sought therefor.

While specific embodiments have been disclosed in order to facilitate full understanding of the invention, the shown embodiments should be appreciated as mere examples of the present invention. Various embodiments and modifications to the shown embodiments, which do not depart from the principles of the invention as set out in the appended claims, should be understood to be within the scope of the invention.

What is claimed is:

1. A decoder for spectrum diffusion signals comprising:
   correlation means for comparing a pseudo-random-noise signal included in the spectrum diffusion signal with a predetermined Gold code identifying a specific channel and producing a back-diffusion signal which includes a peak when said pseudo-random-noise signal corresponds to said predetermined Gold code independent of the phase relation of said pseudo-random-noise signal and said Gold code;
   extraction signal generator means responsive to said back-diffusion signal for producing an extraction signal at a timing near that at which said back-diffusion signal value reaches said peak; and
   extraction means responsive to said extraction signal for extracting a data signal from said back-diffusion signal.

2. The decoder as set forth in claim 1, wherein said correlation means produces a triangular wave each time said pseudo-random-noise signal corresponds to said Gold code.

3. The decoder as set forth in claim 2, which further comprises means for forming a frequency component enveloped by said triangular signal.

4. The decoder as set forth in claim 3, wherein said frequency component enveloped by said triangular signal has a frequency twice as high as a carrier wave in said spectrum diffusion signal.

5. The decoder as set forth in claim 4, wherein said means for forming a frequency component comprises a voltage-controlled oscillator which produces a local oscillation signal having a frequency substantially corresponding to that of said carrier wave, and a multiplier which receives said spectrum diffusion signal and multiplies said spectrum diffusion signal by said local oscillation signal to form said envelope.

6. The decoder as set forth in claim 5, which further comprises oscillation control means associated with said voltage-controlled oscillator for controlling the latter so as to adjust the phase of said local oscillation signal to match the phase of said carrier wave of said spectrum diffusion signal.

7. The decoder as set forth in claim 6, wherein said oscillation control means comprises a multiplier receiving said spectrum diffusion signal and a local oscillation signal, the phase of which is shifted by a phase-shifter to a given offset from the phase of said local oscillation signal output by said voltage-controlled oscillator, a second correlation means for producing a back-diffusion signal including a triangular wave produced when said pseudo-random-noise signal matches said Gold code, a filter for removing high frequency components from said back-diffusion signal of said second correlation means and outputting an envelope signal, a holding circuit receiving said envelope signal and holding the signal level thereof in response to said extraction signal, and a multiplier multiplying said reproduced data signal and the output of said holding circuit so as to derive an oscillation control signal for controlling the signal phase of said local oscillation signal of said voltage-controlled oscillator.

8. The decoder as set forth in claim 7, wherein said extraction signal generator means comprises a multiplier-adder which derives the squares of each of said back diffusion signals of the first-mentioned correlation means and said second correlation means, and then adds said squares to produce a sum indicative signal, and a level detector responsive to the value of said sum indicative signal exceeding a given value to feed said extraction signal to said extraction circuit.

9. The decoder as set forth in claim 3, wherein said means for forming a frequency component comprises a delay circuit and a multiplier, said delay circuit transmitting said back-diffusion signal after a given delay time, and said multiplier multiplying said back-diffusion signal transmitted directly by said correlation means with the delayed back-diffusion signal from said delay circuit to generate said frequency component enveloped by said triangular wave and having a frequency twice as high as the carrier wave of said spectrum diffusion signal.

10. The decoder as set forth in claim 9, wherein said extraction signal generator means comprises an envelope detector producing an envelope indicative signal, and a level detector for monitoring the level of said envelope indicative signal and outputting said extraction signal when the signal level of said envelope indicative signal exceeds a given level.

11. The decoder as set forth in claim 2, wherein said correlation means outputs more than one triangular wave signal during a period corresponding to one cycle of said Gold code.

12. A decoder for spectrum diffusion signals comprising:
correlation means receiving said spectrum diffusion signal for comparing a pseudo-random-noise signal contained in said spectrum diffusion signal with a predetermined Gold code which identifies a corresponding communication channel and producing a back-diffusion signal including a data component representative of a data indicative phase-shift of said spectrum diffusion signal independent of the phase relation of said pseudo-random-noise signal and said predetermined Gold code;
extraction signal generator means associated with said correlation means for detecting a peak value of said data component and producing an extraction signal at a timing near said peak value of said data component; and
extraction circuit means receiving said back-diffusion signal and responsive to said extraction signal to extract said data component from said back-diffusion signal.

13. The decoder as set forth in claim 12, wherein said correlation means produces said data component in the form of a triangular wave each time said pseudo-random-noise signal corresponds to said Gold code.

14. The decoder as set forth in claim 13, which further comprises means for forming a frequency component enveloped by said triangular signal.

15. The decoder as set forth in claim 14, wherein said frequency component enveloped by said triangular signal has a frequency twice as high as a carrier wave in said spectrum diffusion signal.

16. The decoder as set forth in claim 15, wherein said means for forming a frequency component comprises a voltage-controlled oscillator which produces a local oscillation signal having a frequency substantially corresponding to that of said carrier wave, and a multiplier which receives said spectrum diffusion signal and multiplies said spectrum diffusion signal by said local oscillation signal to form said envelope.

17. The decoder as set forth in claim 16, which further comprises an oscillation control means associated with said voltage-controlled oscillator for controlling the latter so as to adjust the phase of said local oscillation signal to match the phase of said carrier wave of said spectrum diffusion signal.

18. The decoder as set forth in claim 16, wherein said oscillation control means comprises a multiplier receiving said spectrum diffusion signal and a local oscillation signal, the phase of which is shifted by a phase-shifter to a given offset from the phase of said local oscillation signal output by said voltage-controlled oscillator, a second correlation means for producing a back-diffusion signal including a triangular wave produced when said pseudo-random-noise signal matches said Gold code, a filter for removing high frequency components from said back-diffusion signal of said second correlation means and outputting an envelope signal, a holding circuit receiving said envelope signal and holding the signal level thereof in response to said extraction signal, and a multiplier multiplying said data component and the output of said holding circuit so as to derive an oscillation control signal for controlling the signal phase of said local oscillation signal of said voltage-controlled oscillator.

19. The decoder as set forth in claim 18, wherein said extraction signal generator means comprises a multiplier-adder which derives the squares of each of said back diffusion signals of the first-mentioned correlation means and said second correlation means, and then adds said squares to produce a sum indicative signal, and a level detector responsive to said sum indicative value exceeding a given value to feed said extraction signal to said extraction circuit means.

20. The decoder as set forth in claim 14, wherein said means for forming a frequency component comprises a delay circuit transmitting said back-diffusion signal after a given delay time, and a multiplier multiplying said back-diffusion signal transmitted directly by said correlation means with the delayed back-diffusion signal from said delay circuit to generate said frequency component enveloped by said triangular wave and having a frequency twice as high as the carrier wave of said spectrum diffusion signal.

21. The decoder as set forth in claim 20, wherein said extraction signal generator means comprises an envelope detector producing an envelope indicative signal, and a level detector for monitoring the level of said envelope indicative signal and outputting said extraction signal when the signal level of said envelope indicative signal exceeds a given level.

22. The decoder as set forth in claim 13, wherein said correlation means outputs more than one triangular wave signal during a period corresponding to each cycle of said Gold code.

23. A process for reproducing a data signal from a spectrum diffusion signal comprising the steps of:
receiving said spectrum diffusion signal, comparing a pseudo-random-noise signal contained in said spectrum diffusion signal with a predetermined Gold code which identifies a communication channel, and producing a back-diffusion signal including a data component which is representative of a data indicative phase-shift of said spectrum diffusion signal and is independent of the phase relation of said pseudo-random-noise signal to said Gold code;
detecting peak values of said data component and producing an extraction signal at a timing near each of said peak values of said data component; and
extracting said data component from said back-diffusion signal in response to said extraction signal.

24. The process as set forth in claim 23, wherein said data component is in the form of a triangular wave occurring each time said pseudo-random-noise signal corresponds to said Gold code.

25. The process as set forth in claim 24, which further comprises a step of forming a frequency component enveloped by said triangular wave.

26. The process as set forth in claim 25, wherein said frequency component enveloped by said triangular wave has a frequency twice as high as a carrier wave in said spectrum diffusion signal.

27. The process as set forth in claim 26, which further comprises a step of controlling phase of a local oscillation signal utilized for forming said frequency component so as to adjust the phase of said local oscillation signal to match the phase of said carrier wave of said spectrum diffusion signal.

28. The decoder as set forth in claim 25, wherein said frequency component is formed by transmitting said back-diffusion signal after a given delay time, and multiplying said back-diffusion signal transmitted directly with said delayed back-diffusion signal to generate said frequency component enveloped by said triangular wave and having a frequency twice as high as the carrier wave of said spectrum diffusion signal.

* * * * *